United States Patent Office 2,917,796
Patented Dec. 22, 1959

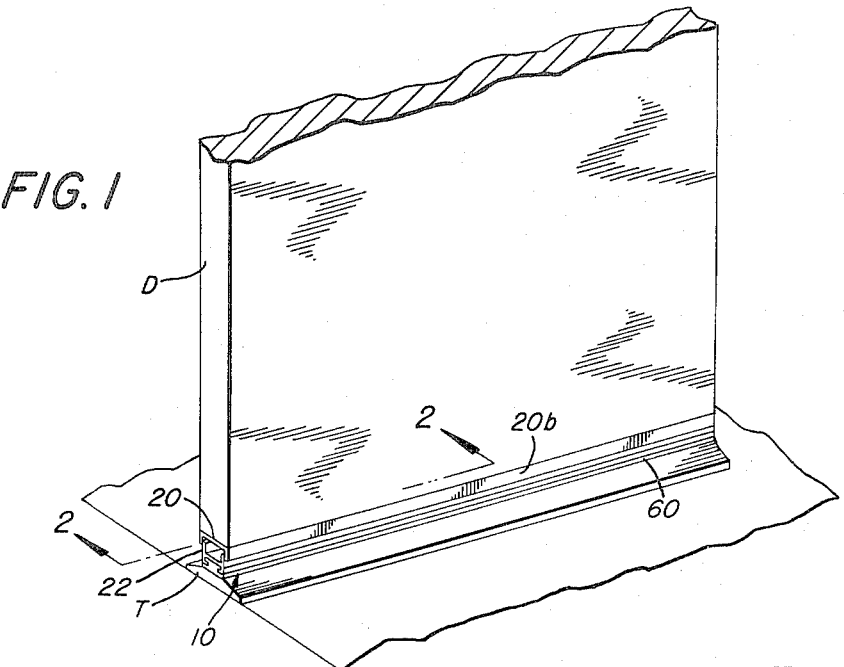
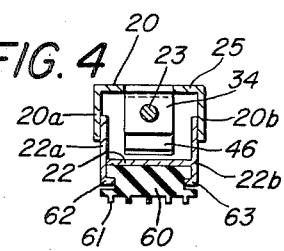
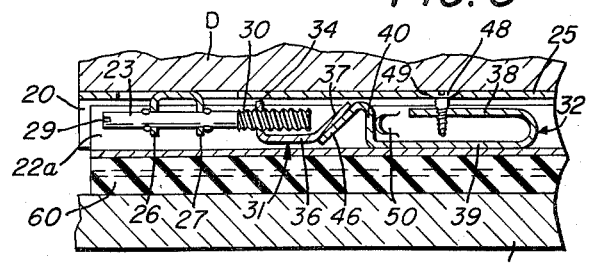
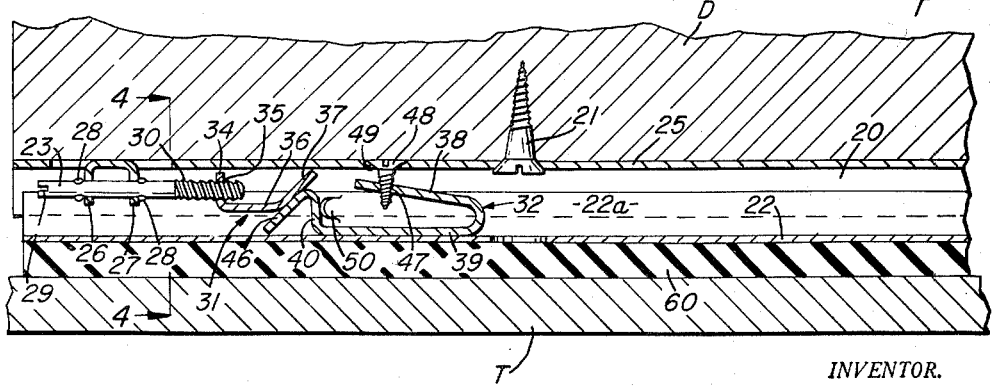

2,917,796

ADJUSTABLE WEATHERSTRIPPING FOR DOORS

Aloysius T. Kunkel, Akron, Ohio; Albert A. Kunkel, administrator of the estate of said Aloysius T. Kunkel, deceased Application June 13, 1958, Serial No. 741,835

5 Claims. (Cl. 20—68)

This invention relates to weather stripping devices, and in particular has reference to improvements in weather stripping units that are designed to seal the horizontal clearance space that exists between the lowermost section of a swingable closure member and the threshold of the frame member positioned adjacent thereto.

In the known prior art it is well-known that the dimension of a door, for example, is never the same as the dimension of the frame within which the same is swingably mounted in view of the fact that clearance must be provided between these members for various reasons. Because such clearance areas are vulnerable to the passage of air, weather stripping of various types are positioned in these clearance areas in an attempt to minimize the heat loss occurring in these regions. With particular reference to the sealing or weather stripping of the threshold area of a swinging door, for example, the known prior art discloses several forms of weather stripping varying in complexity from the single "wiper" type of weather stripping that merely makes frictional contact with the threshold, to certain complex types that depend for their effectiveness on intricate interlocking between door and threshold to effectuate a purported seal.

Two salient disadvantages presently characterize the known type of weather stripping for thresholds that are above discussed.

First, because the present type of weather stripping can be positioned only in certain minimum clearance areas between the threshold and the door, it is necessary to "fit" this weather stripping between the door and the threshold with a certain degree of accuracy, with the result that such installation can normally only be made by skilled artists specializing in such type of work. Additionally, because the threshold member is normally metal, present practice dictates that the alteration of door size be accomplished by sawing or planing the door until the required "fit" or clearance with respect to the threshold is obtained. Such a procedure can be employed on doors or closure members that are made of wood, although in actuality, the same is disadvantageous because of the labor cost that is involved in such "fitting" operations that are above described.

However, when metal or aluminum doors are being installed such a "fitting" operation is not possible at all, in view of the fact that the metal frame members of the door cannot be sawed or planed by the ordinary tools possessed and used by journeymen of the trade. Accordingly, at the present time installers of such metal doors normally leave as small a clearance as possible between the door and the threshold area, and omit the installation of weather stripping in this area. Such a procedure is disadvantageous because of the obvious heat loss that occurs in this area.

The second disadvantage of the known prior art relates to the inability of the same to clean itself of normal foreign objects that accrue on the top surface of the threshold per se, during normal use. Such objects include rain water, sleet, snow, dirt and grit. This lack of self-cleaning ability in such structure arises because conventional weather stripping requires that the wiper or other contact element that is secured to the closure member be positioned adjacent the internal surface of the door, so as to make a purported sealing contact with that raised portion of the threshold that is adjacent the inner surface of the door being sealed. The fact that an artificially created friction contact accounts for whatever sealing is obtained, dictates that this pressure of contact be great; and accordingly, such wiper contacts could not be provided adjacent the outer portion of the closure member because of the obvious fact that the door could not be closed, in view of the interference that would exist with respect to the threshold member.

To the present time, the known prior art has attempted to alleviate this difficulty by providing "drain-backs" that attempt to centrally collect such foreign objects and then wash the same to a point exterior of the door by the use of liquids that are entrapped during a storm, for example, Such drain-back systems have been found to defeat themselves, however, in view of the fact that the dirt accruing invariably clogs the entry ports to the collecting chamber, with the result that the liquid cannot enter the chamber to effectuate the desired washing action.

In addition to the foregoing limitations of such drain-back systems, it is apparent that the same are expensive in construction because of the intricate design thereof, with the result that the cost of the same to the ultimate purchaser is excessive.

Another limitation of the known prior art type of weather striping for threshold areas, relates to the fact that a single sealing contact is normally relied on at the present time, to prevent air passage in this clearance area existing between the door and the threshold, it being heretofore impractical to provide a second sealing barrier adjacent the outside face of the door, because of the unsolved interference problems occurring in the limited vertical space that is capable of being utilized to effectuate weather stripping of a proper degree.

In co-pending application Serial No. 502,321, filed April 19, 1955, now Patent No. 2,880,477, issued April 7, 1959, there has been disclosed an improved type of weather stripping unit for the threshold door of a metallic swingable closure member.

The adjustment mechanism of this co-pending application contemplates the loosening and positioning, together with the resetting in a locked position, of the sealing members carried on the closure member. Thus, it is not possible in the type of weather stripping unit disclosed in the co-pending application above referred to, to adjust to a very fine degree, it being necessary in each case to unloosen, position and subsequently re-tighten the sealing unit per se of the weather stripping unit.

In co-pending application, Serial No. 526,817, filed August 8, 1955, by A. T. Kunkel, there was provided an improved type of weather stripping device for use on the threshold of the swingable door, with this threshold member having the advantage of being adjustable without disassembly of the device from the door member, with the adjustment actually being accomplished from the exterior of the device.

In this device, the adjustment feature was accomplished through the medium of inclined blocks that acted against each other to cause an effective separating movement to occur between the component parts of the device, with movement of the blocks being accomplished merely by rotation of an adjustment screw that was accessible from either longitudinal end of the device. While this device has functioned well in usage, it is nonetheless the fact that the same requires that the door be modified to include inward bores on the lower edge, with these bores accommodating the spring-loaded shafts upon which one of the slide blocks is positioned. It has been found that improved results can be obtained if the vertically shiftable block is simplified to the extent that the same becomes a component element of the adjustable portion and which will move towards and from the door dependent upon adjustment of the remaining adjustment member.

The making of such an improved type of adjustable weather stripping device is accordingly the principal object of this invention with other objects of the invention becoming more apparent upon a consideration of the following brief specification, considered and interpreted in the light of the accompanying drawings.

Of the drawings:

Figure 1 is a perspective view of the improved device attached between a swingable door and a threshold member.

Figure 2 is a sectional view taken on the lines 2—2 of Figure 1 and illustrating the position of the component parts in an extended condition.

Figure 3 is a view similar to Figure 2, but showing the position of the parts in a retracted condition.

Figure 4 is a view taken on the lines 4—4 of Figure 2.

Referring now to the drawings, and in particular to Figure 1 thereof, the improved weather stripping unit, generally designated by the numeral 10, is shown secured to the lowermost portion of a door D so as to effectuate sealing between the door D and a threshold member T that is associated therewith, as is clearly shown in Figure 1.

Referring next to Figures 2, 3 and 4 for a detailed consideration of the weather stripping means 10, it will be seen that the same includes interfitting elongated channels 20 and 22, with the channel 20 being fixed to door D as by screw 21, while channel 22 is adjustably secured with respect to the channel 20 and door D so as to be movable towards and from the same upon rotation of a screw member 23 as will be hereinafter described in fuller detail. In this regard, each of the channels 20 and 22 is illustrated in the preferred embodiment of the invention as being of generally U-shaped configuration, with channel 20 having a slightly larger width so as to permit the channel 22 to be received therein as is clearly shown in Figures 1 and 4 of the drawings. Thus, the legs 20a and 20b of channel 20 are shown disposed in overlapped abutment with the legs 22a and 22b of channel 22, and in this manner, the legs 20a and 20b will serve as ways for movement of the channel 22 towards and from the channel member 20.

For the purpose of supporting certain components as will hereinafter be described, the base portion 25 of channel member 20 further includes struck tabs 26 and 27 that are appropriately apertured to permit reception of shaft 23 therethrough, as is clearly shown in Figures 2 and 3 of the drawings, with shaft 23 further including struck portions 28, 28 that prevent axial shifting of the shaft 23 with respect to the tabs 26 and 27. In this manner, upon rotation of shaft 23, as by positioning of an appropriate turning tool in turning slot 29 thereof, the threaded portion 30 of the shaft 23 will cause the wedge member 31 to advance or retract axially of the threaded portion 30, and in this manner, the inclined surface of the wedge member 32 will be moved towards or from the base portion 25 to effectuate adjustment of the channel member 22.

Turning next to a consideration of the just-mentioned wedge members 31 and 32, it will be seen that both of the same are preferably contoured of thin, spring-steel material, with the member 31 having a leg portion 34 that is appropriately provided with a threaded aperture 35 that surrounds the threads 30. Extending at right angles from this flange 34 is a base portion 36 that terminates in an upwardly and outwardly extending (Figure 2) flange 37, with this flange 37 having an inclined surface for co-action with an appropriately contoured surface of member 32, as will now be described. Accordingly, the member 32 is illustrated as being defined by an U-shaped base defined by parallel legs 38 and 39, with the leg 39 terminating in a right angle flange 40 that has its projecting end defining a return flange 46 with the angle of inclination of flanges 47 and 37 being approximately parallel so that the contacting surfaces thereof can co-act in wedge fashion, as will be hereinafter described. Also, and as shown best in Figures 2 and 3, the leg 38 is provided with an appropriately tapered aperture 47 within which the screw 48 can be received, with the head of this screw 48 being received in an appropriate countersunk aperture 49 that is provided in base 25.

Additionally, and for the proposition of retaining the member 32 against longitudinal movement with respect to channel 22, the same (channel 22) is shown having its leg portions 22a and 22b provided with inwardly struck tabs 50, 50 that, in turn, retain the member 32 in place against inward shifting when the shaft 23 is rotated. These tabs 50, 50 also prevent movement apart of these members when screw 48 is secured to leg 38 as shown in Figures 2 and 3. It is also to be noted in this regard, that the preferred embodiment of the invention contemplates that the transverse width of the members 31, 32 approximates the transverse width of the base 25, and in this manner, substantial contact surfaces will be provided by the flanges 37 and 46 for sliding contact with each other. Also the base of channel 22 further includes at least one aperture 22a that is aligned opposite the aperture 49 when the channels 20 and 22 are interfitted so as to permit accessibility to screw 21.

Thus far, the description of the adjustment means has been recited in connection with the adjustment means that are provided at one longitudinal end of the channel members 20 and 22. It is to be understood, however, that the preferred embodiment of the invention contemplates the provision of an equivalent adjusting device at the other longitudinal end thereof.

In addition to the aforementioned component parts, it is to be understood that the channel member 20 also supports a wiper element 60 that has a plurality of sealing fingers 61, 61, with this wiper element 60 being contoured to fit within in-turned flanges 62, 63 that depend from the channel 22 as best shown in Figure 2 of the drawings.

In use or operation of the improved sealing device, it will first be assumed that the component parts associated with the channel members 20 and 22 have been assembled thereon, with the member 32 being loosely positioned in place by the tabs 50, 50 and with the member 31 being affixed to threaded portion 30 of shaft 23, which has, in turn, been positioned in rotatable relationship in tabs 26 and 27. At this time, the screw 48 can be positioned in place with its threaded end received in the aperture 47 of the leg 38, and with the component parts thus assembled, the screw 21 may be passed through opening 22a in channel 22 and then positioned on door D by passing the same through an aperture 49 of base 25.

At this time, the device will be firmly secured with respect to the door and to effectuate adjustment of the same, it is merely necessary that rotational turning force be applied to the shaft 23. Assuming, for example, that it was desired to move the component parts from the position of Figure 3 to the position of Figure 2, it would merely be necessary to impart clock-wise rotational movement to the shaft 23. This would cause the member 31 to move to the right of Figure 3, and during this movement, the inclined surface of flange 37 would act against the surface 47 and would move the same downwardly of Figure 2, to accordingly cause the member 22 to be moved away from the member 20 towards the position of Figure 3, with tabs 50, 50 preventing the member 32 from shifting to the right during such movement. Also, as best illustrated in Figure 3, the arm 38 will be retained in place on screw 48 and will be distorted to the condition of Figure 3.

If it is desired to move the wiper back towards the door, it is merely necessary that rotational movement be applied in an opposite direction, at which time the inherent recovery properties of the spring-steel member 32 will cause the same to return to the position of Figure 2 when the flange 37 has been removed from interference with the flange 46.

While a full and complete description of the invention has been set forth in accordance with the dictates of the patent statutes, it is to be understood that the invention is not intended to be so limited.

Accordingly, modifications of the invention may be resorted to without departing from the spirit hereof or the scope of the appended claims.

This application is a continuation-in-part of co-pending application Serial Number 526,817, filed August 8, 1955, by Aloysius T. Kunkel.

What is claimed is:

1. A weatherstripping device for attachment to movable closure members of the character described, comprising; an elongated securing member fixed to said closure member; an elongated supporting member; at least one yieldable spring member of generally U-shaped configuration, having one leg portion secured adjacent one end to said securing member and having the remaining leg portion thereof engaged with said supporting member in shiftable relationship therewith; an elongated sealing strip carried by said supporting member and being movable therewith; an elongated shaft extending longitudinally of said securing member and being rotatably journalled with respect thereto; an inclined wedge carried by one axial end of said shaft in axially shiftable relationship therewith and bearing against a projecting portion of said remaining leg portion whereby said spring member may be deformed upon rotation of said shaft.

2. A weatherstripping unit for attachment to movable closure members of the character described, comprising; a first U-shaped channel member having a base portion that is secured to said closure member; a second channel member having an U-shaped base portion that is telescopically received between the opposed legs of said first-mentioned channel member; a connecting spring of generally U-shaped configuration, having one leg secured to the base of said first channel member and having the remaining leg portion retained adjacent the base of said second channel member, with said spring normally urging said base portions towards each other; a shaft extending longitudinally of said first channel and being disposed between the same and said supporting member; said shaft being rotatably journalled with respect to said channel; and a member having a wedge surface carried by said shaft in axially shiftable relationship therewith; a second wedge surface carried by the projecting end of said remaining leg portion; said first wedge surface contacting said second wedge surface whereby said spring will be deformed upon rotation of said shaft.

3. The device of claim 2 further characterized by the fact that said shaft is threadingly connected with said member whereby said member advances axially of said shaft upon rotation of the same.

4. The device of claim 2 further characterized by the presence of means for preventing longitudinal displacement of said spring with respect to at least one said channel during deformation of said spring.

5. A weatherstripping unit for attachment to movable closure members of the character described, comprising; a first U-shaped channel member having a base portion that is secured to said closure member; a second channel member having an U-shaped base portion that is telescopically received between the opposed legs of said first-mentioned channel member; a connecting spring of generally U-shaped configuration, having one leg secured to the base of said first channel member and having the remaining leg portion retained adjacent the base of said second channel member, with said spring normally urging said base portions towards each other; means for moving said channel members apart against the force of said spring while retaining longitudinal alignment therebetween; and means for retaining said channel members in said spaced apart relationship notwithstanding the contracting force of said spring.

References Cited in the file of this patent

UNITED STATES PATENTS

| | | |
|---|---|---|
| 652,489 | Sandberg et al. | June 26, 1900 |
| 2,668,318 | Le Bon | Feb. 9, 1954 |